United States Patent Office 3,345,290
Patented Oct. 3, 1967

3,345,290
PROCESS FOR FORMING A LUBRICATING COMPOSITION
Alfred J. Strohmaier, Nanticoke Estates, Del., assignor to E. I. du Pont de Nemours and Company, Wilmington, Del., a corporation of Delaware
No Drawing. Filed Mar. 30, 1965, Ser. No. 444,039
1 Claim. (Cl. 252—18)

ABSTRACT OF THE DISCLOSURE

A process for forming a lubricating composition for melt spinning pack rings which comprises mixing as alkyl-aryl silicone with a lithium soap and boron nitride followed by heating while stirring and then cooling to room temperature.

---

This invention provides novel silicone lubricating compositions and a method for their preparation.

Threaded pack rings for the installation of spinneret packs in melt spinning machines for synthetic textile fibers are exposed to high temperatures for extended periods of time. The exposure may be for days, or even weeks at a time, at a temperature of 290° C. or even higher. A thermally stable thread lubricant is required to assure uniform sealing of the rings to avoid polymer leaks and to permit their easy removal during a pack change. Such threaded rings are shown in U.S. Patent 3,104,419 to La Forge at 6 in the drawing and also in U.S. Patent 3,028,627 to McCormick in FIGURE 3 at 66. For practical purposes in the trade it is desirable that this lubricant be white or colorless.

Greases prepared from silicone oils thickened with a soap are well known for their good thermal stability. Such greases are difficult to prepare because of the incapacity of the silicone fluids for dissolving the soap. Normally, their preparation requires the use of an aqueous solution or dispersion (U.S. 2,684,944), or other solvent (U.S. 2,446,177) which subsequently must be removed. Furthermore, such greases are not completely satisfactory in their performance as melt spinning pack ring lubricants.

An object of this invention is an essentially colorless, easily prepared, thermally stable lubricant which prevents thread galling and allows easy removal of threaded spinneret pack rings after prolonged exposure to high temperatures. Other objects will become apparent from the following description.

The invention comprises a mixture of a major amount of a mixed alkyl-aryl silicone polymer, from about 1 to 15% by weight of the mixture of a lithium soap of a fatty acid and from about 1 to 20% by weight of the mixture of boron nitride.

A preferred embodiment of the invention is a lubricating composition comprising a mixture of a major amount of a mixed methyl-phenyl silicone having a viscosity of about 100 to 150 centistokes at room temperature, from about 5 to 15% by weight of the mixture of lithium stearate and from about 5 to 15% by weight of the mixture of boron nitride.

The lubricating composition of this invention can be prepared merely by mixing the weighed ingredients, heating to 100–150° C., while stirring until the ingredients are thoroughly mixed, and continue stirring while allowing the mixture to cool to room temperature.

Unlike the lithium stearate-silicone greases of the prior art which require the use of special preparative procedures to form a grease in order to be effective, the composition of this invention operates effectively even though it is a relatively coarse liquid-solid mixture which tends to separate upon prolonged standing. As shown by the following examples, this is due to the presence of the boron nitride.

Example

A mixture consisting of 85% by weight methyl-phenyl silicone having a viscosity of 100–150 centistokes at room temperature (Dow Corning DC–550 fluid), 10% boron nitride and 5% lithium stearate is prepared by the procedure described above. The resulting product is a coarse liquid-solid mixture which tends to settle out on prolonged standing. The mixture is applied to the threads of hot spinneret pack rings (as in U.S. 3,104,419) prior to installation. The spinneret packs are maintained at a temperature of at least 280° C., for at least one week. Upon removal of the rings no galling of the threads has occurred and the rings are easily removed.

A mixture is prepared as above consisting of 90% by weight of a methyl-phenyl silicone (Dow Corning DC–550 fluid) and 10% boron nitride. When tested as above, some galling of the threads occurs during installation of the pack rings.

The lubricating compositions of this invention contain at least about 1% by weight boron nitride and 1% by weight lithium stearate in addition to the silicone. A preferred composition contains 10% boron nitride and 5% lithium stearate. Where a more grease-like composition is desired the boron nitride may be incorporated into a lithium stearate-silicone grease of the prior art to provide better retention of the lubricant in the threads at high tempertaures.

Other thermally stable silicone fluids may be used in this invention in viscosities ranging between 100 to 1,000 centistokes at room temperature. Generally the mixed alkyl-aryl silicones show superior resistance to smoking and thermal decomposition.

Lithium stearate is preferred because of its somewhat better resistance to breakdown at high temperatures as compared to other gelling agents such as sodium stearate, potassium stearate, barium stearate, aluminum stearate.

The composition of this invention should be useful in other types of threaded joints, bearings, linkages, etc., which require boundary lubrication upon prolonged exposure to high temperatures. This composition is particularly advantageous where an essentially white or colorless lubricant is preferred or required.

Other aspects of this invention will be apparent to those skilled in the art.

What is claimed is:

A process of preparing a lubricating composition comprising:
(1) mixing an alkyl-aryl silicone polymer with from about 1 to 15% by weight of the composition of a lithium soap and from about 1 to 20% by weight of the composition of boron nitride,
(2) heating said composition to about 100 to 150° C. while stirring, and
(3) cooling the said composition to room temperature while continuing said stirring.

References Cited
UNITED STATES PATENTS 2,693,449  11/1954  Hain et al. _____ 252—49.6
3,196,109   7/1965  Morway et al. _____ 252—25

DANIEL E. WYMAN, *Primary Examiner.*

I. VAUGHN, *Assistant Examiner.*